United States Patent [19]

Sundquist

[11] Patent Number: 5,795,842
[45] Date of Patent: Aug. 18, 1998

[54] OIL-ABSORBING ARTICLE COMPRISING WOOL FELT FORMING AN ENCLOSURE CONTAINING PINE BARK

[76] Inventor: Tore Sundquist, Bleikerfaret 88, N-1370 Asker, Norway

[21] Appl. No.: 676,291

[22] PCT Filed: Jan. 19, 1995

[86] PCT No.: PCT/NO95/00015

§ 371 Date: Jul. 18, 1996

§ 102(e) Date: Jul. 18, 1996

[87] PCT Pub. No.: WO95/19842

PCT Pub. Date: Jul. 27, 1995

[30] Foreign Application Priority Data

Jan. 19, 1994 [NO] Norway ........................... 940192

[51] Int. Cl.⁶ .............................. B01J 20/00; C02F 1/42
[52] U.S. Cl. ..................... 502/400; 210/679; 210/680; 210/690; 210/691
[58] Field of Search .................... 502/400, 402; 210/671, 691, 679, 680, 690

[56] References Cited

U.S. PATENT DOCUMENTS

| | | | |
|---|---|---|---|
| 3,617,565 | 11/1971 | Fahlvik | 210/691 |
| 3,980,566 | 9/1976 | Peterson | 502/401 |
| 4,072,794 | 2/1978 | Tomita et al. | 502/402 |

FOREIGN PATENT DOCUMENTS

| | | |
|---|---|---|
| 0027359 | 4/1981 | European Pat. Off. . |
| 2402594 | 4/1979 | France . |
| 0069675 | 1/1983 | France . |
| 1939490 | 2/1970 | Germany . |
| 1813609 | 6/1970 | Germany . |
| 120879 | 12/1970 | Norway . |

*Primary Examiner*—Glenn Caldarola
*Assistant Examiner*—In Suk Bullock
*Attorney, Agent, or Firm*—Dickinson, Wright, Moon, Van Dusen & Freeman

[57] ABSTRACT

An oil absorbing article is made of an outer covering of wool felt that forms an enclosure containing pine bark. The covering may be in the form of a mat, a pillow, or a boom. The outer covering allows the oil to pass through into the bark, which becomes saturated with the oil. This saturation prevents flow of water to the bark, whereby the article remains floating after absorption of oil.

9 Claims, 1 Drawing Sheet

OIL-ABSORBING ARTICLE COMPRISING WOOL FELT FORMING AN ENCLOSURE CONTAINING PINE BARK

TECHNICAL FIELD

This invention relates to an oil-absorbing article which may be used both on land and on water.

BACKGROUND OF THE INVENTION

Oil pollutions represent a considerable pollution problem, and several different methods and means have been suggested and are used for collecting or possibly destroying oil spill.

A means which has successfully been used for taking up oil, is fine-grained, dried pine bark. This material has been spread out over areas which have been exposed to oil spill, and by using suitable amounts of bark it has then been possible to remove essentially all oil spill. However, in many cases it is not practical to store and use such a fine-grained material, since for instance the collection of the material after use entails considerable work. It has been tried to include bark in different types of materials, but those efforts which have been made so far have not been successful. By using porous paper bags as an outer cover filled with fine-grained, dried pine bark, it was found that the outer cover itself absorbed oil, but then it blocked for further take up of oil through the paper and into the bark. Experiments have also been made with fine-mesh bags, but the bags have either had such large openings that the bark powder has fallen out, or the bags have been so tight that they have given the same result as the paper bags.

Compared with the use of loose bark it is of course much more practical to have the oil absorbing bark in an outer covering which lets oil through to become absorbed by the bark surrounded by the outer covering. Such an article with an outlet covering may easily be stored, used and removed after use. However, as mentioned above, the problem has been that so far a suitable outer covering has not been found.

SUMMARY OF THE INVENTION

According to the invention there is provided an oil-absorbing article which is characterized in that it comprises an outer covering which primarily consists of wool felt, and this outer covering surrounds a core which primarily consists of fine-grained dried pine bark.

"Pine" comprises trees of the genus Pinus, in particular ordinary pine (*Pinus silvestris*), but also other species of pine such as *Pinus contorta, Pinus cembra, Pinus nigra* and *Pinus ponderosa*.

It is of decisive importance that the pine bark has been dried well. The drying of fine-grained, such as milled bark must take place carefully to remove all or essentially all moisture. The drying may for instance take place in a cyclone as per se known.

The outer covering of wool felt has the surprising property that in use it will let oil through into the bark which becomes saturated with oil. In contrast to paper, the wool outer coating will let oil through even after it has become saturated with oil. The saturation with oil will also prevent absorption of water, which means that the oil-absorbing article will remain floating on water after absorption of oil when used as an oil boom or in a similar manner on water.

The wool felt must be so dense that the bark can not get out, but on the other hand not so dense that it is difficult for the oil to get in.

In particular when the oil-absorbing article according to the invention is relatively large, it may be desirable to include internal separating walls which suitably may be of the same material as the outer coating. This will give the article a greater stability and prevent the bark from displacement.

Similarly, in many cases it will also be suitable that the article contains a reinforcement, particularly in the outer coating, so that it will have less tendency to break or crack. This applies in particular to large articles which for instance will be handled by means of fork truck or similar apparatus. The reinforcement may be of any suitable material, and preferably natural materials are used such as jute.

The wool used in the outer coating may suitably be waste wool, i.e. waste material, which may be shaped to wool felt, optionally with reinforcement included therein.

After use the oil-saturated article may according to public regulations be deposited directly on a refuse dump without any special depositing or combustion, since oil is not given off. The oil-absorbing article according to the invention is thus very favorable from an environmental point of view, since the outer coating as well as the core may be prepared from waste materials, polluting oil is removed, and the oil-saturated article may after use be deposited without any environmental risk, and will gradually be degraded.

The oil-absorbing article according to the invention may in addition to removing oil, also be used for removing other polluting chemicals, in particular such chemicals of an oily character.

The article according to the invention may be used at several different locations, for instance by ordinary consumers (boats, petrol stations, small garages etc.), in the industry (larger garages, industrial companies, oil refineries etc.) and for oil protection at sea (which will in particular mean oil booms).

Depending on the intended use the article according to the invention may have different shapes, for instance as a bag, mat or "Sausage", and may also be shaped as an oil boom.

During transportation and storage the article according to the invention is suitably kept in a suitable wrapping, such as a plastic bag. It will then be avoided that the article becomes wet or is damaged.

DETAILED DESCRIPTION OF THE INVENTION

Figure 1:
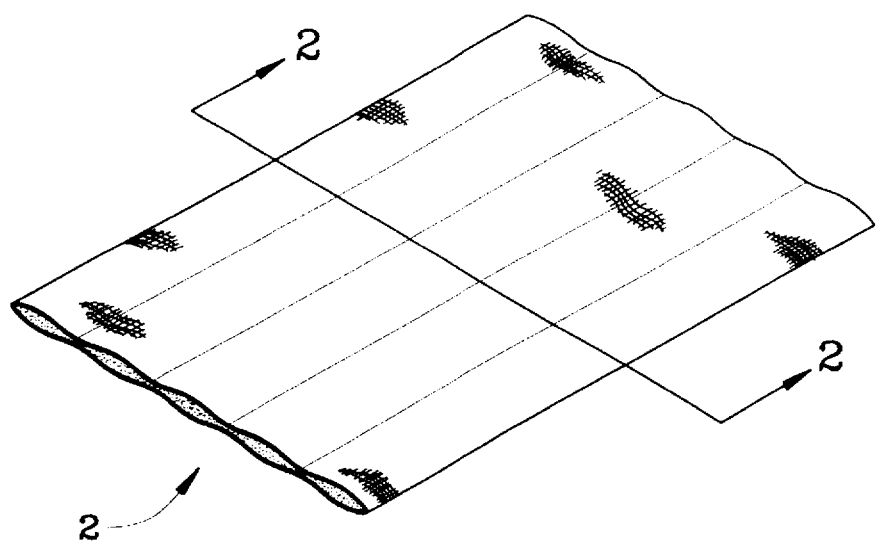
FIG. 1 is a perspective of an oil-absorbing mat in accordance with the invention.
Figure 2:
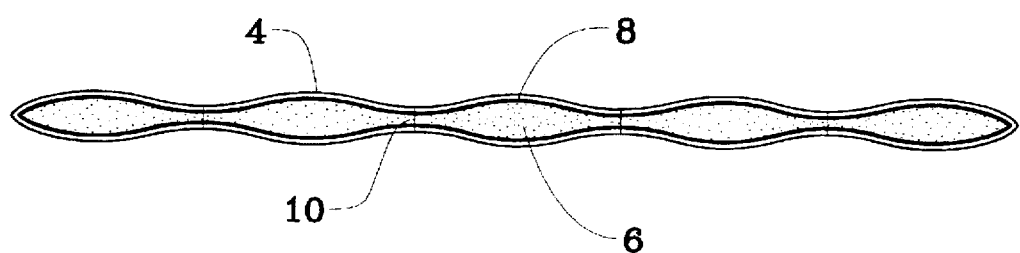
FIG. 2 is a cross section taken along line 2—2 of FIG. 1.

With reference to FIG. 1 an oil absorbing article 2 in accordance with the invention is shown in the form of a mat. FIG. 2 is a cross section showing the outer wool covering 4 and the inner core 6 of pine bark. A layer 8 of jute may be placed below the wool layer for reinforcement, if desired.

The article may have internal walls 10 to separate the interior of the article into separate compartments. These walls may be made of the wool material or other materials.

Figure 3:
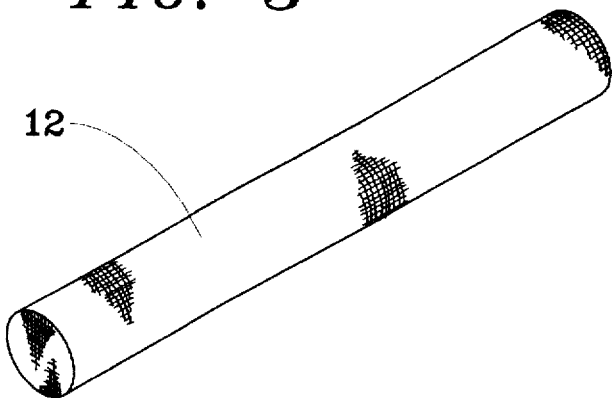
FIG. 3 is a perspective of an embodiment of the invention in the form of a boom.

FIG. 3 shows yet another embodiment of the invention in the form of a boom 12.

EXAMPLE

An oil-absorbing article according to the invention was prepared in the form of a pillow having a size of 22×12 cm and a thickness of 5 cm. with an outer coating of wool felt of about 0.5 cm and a core of fine-grained, dried pine bark from mountain pine.

On a water surface of 15×0.8 m approximately 1 l of waste oil was poored. The pillow was then placed on the surface and moved around thereon, and after about 1 hour approximately all the oil was absorbed in the pillow, and just a very thin oil film remained. When the pillow was taken up from the surface, only water drops came out, and it did not give off any oil.

I claim:

1. An article for absorbing oil comprising an outer covering comprising wool felt forming an enclosure and an inner core comprising fine-grained dried pine bark contained within said enclosure.

2. An article according to claim 1 further comprising a reinforcing layer between said covering and said pine bark.

3. An article according to claim 1 wherein said outer wool felt is made of waste wool.

4. An article according to claim 3 further comprising a reinforcing layer of jute.

5. An article according to claim 1 further comprising interior walls dividing said enclosure into separate compartments.

6. An article according to claim 5 wherein said interior walls are made of said wool felt.

7. An article according to claim 1 wherein said outer covering is in the shape of a mat.

8. An article according to claim 1 wherein said outer covering is in the shape of a boom.

9. An article according to claim 1 wherein said pine bark is mountain pine bark.

* * * * *